United States Patent
Ohsaki et al.

[11] Patent Number: 6,158,420
[45] Date of Patent: Dec. 12, 2000

[54] DIAGNOSTIC APPARATUS AND METHOD FOR SUPPLYING ASSIST AIR IN AN INTERNAL COMBUSTION ENGINE

[75] Inventors: Masanobu Ohsaki; Michiyuki Fujimoto; Seiichi Ohtani; Katsuyoshi Shiobara, all of Gunma, Japan

[73] Assignee: Unisia Jecs Corporation, Isesaki, Japan

[21] Appl. No.: 09/280,067

[22] Filed: Mar. 29, 1999

[30] Foreign Application Priority Data

Mar. 30, 1998 [JP] Japan .................. 10-084383

[51] Int. Cl.$^7$ ............... F02M 23/00; F02D 41/22
[52] U.S. Cl. ............. 123/531; 73/117.3; 73/118.2
[58] Field of Search ................... 123/531, 585; 73/117.3, 118.2

[56] References Cited

U.S. PATENT DOCUMENTS

| | | | |
|---|---|---|---|
| 4,416,241 | 11/1983 | Knapp et al. | 123/585 |
| 4,875,456 | 10/1989 | Tomisawa | 123/585 |
| 4,892,072 | 1/1990 | Miwa et al. | 123/585 |
| 4,895,118 | 1/1990 | Nakamura | 123/585 |
| 4,922,879 | 5/1990 | Kaji et al. | 73/118.2 |
| 5,289,808 | 3/1994 | Takahashi et al. | 123/486 |
| 5,427,081 | 6/1995 | Bombarda et al. | 123/585 |
| 5,487,372 | 1/1996 | Iida et al. | 123/585 |
| 5,653,212 | 8/1997 | Hotta et al. | 73/117.3 |
| 5,809,965 | 9/1998 | Atanasyan | 123/585 |

*Primary Examiner*—Erick Solis
*Attorney, Agent, or Firm*—Foley & Lardner

[57] ABSTRACT

A diagnostic apparatus for supplying an assist air in an internal combustion engine includes: an assist air passage for guiding intake air from upstream of a throttle valve to a fuel injector installed downstream of said throttle valve; an assist air control valve installed in said assist air passage; a sensor for detecting an engine operating parameter; and a control unit. The control unit includes a data storage portion and a data processing portion. The control unit selectively forces the assist air control valve open and closed upon detection of at least one predetermined diagnosis condition. The control unit then calculates and stores a plurality of values corresponding to changes in the engine operating parameter based on signals received from the sensor, and determines an occurrence of an error with assist air supply based on comparisons of said values with a predetermined value.

26 Claims, 7 Drawing Sheets

DIAGNOSTIC APPARATUS AND METHOD FOR SUPPLYING ASSIST AIR IN AN INTERNAL COMBUSTION ENGINE

FIELD OF THE INVENTION

The present invention relates in general to a diagnostic apparatus and method for supplying assist air in an internal combustion engine. More particularly, the invention relates to a system and method in which assist air is formed from a portion of an intake air and is supplied in proximity to an injection hole of a fuel injector.

DESCRIPTION OF THE BACKGROUND ART

Generally speaking, an electronic fuel injector is installed at each cylinder in a branch portion of an intake manifold or at an intake port of an internal combustion engine. An apparatus for providing assist air-induced atomization of fuel is well known.

In such an apparatus, a portion of the intake air is guided along an assist air passage from the upstream side of a throttle valve, which is supplied in proximity to the injection hole of the fuel injector. Mixture of fuel with the assist air obtained thereby can improve flammability and emission by atomizing the injected fuel. But, when the assist air passage is blocked or when an assist air shift valve (AAI/V) that is installed in the assist air passage fails, the supply of assist air cannot be controlled. This detrimentally affects performance, fuel economy, and emission.

Japanese Published Unexamined Patent Application No. Heisei 3-217639, published on Sep. 25, 1991, exemplifies a previously proposed diagnostic apparatus for supplying assist air in an internal combustion engine. In that application, when the AAI/V changes from off to on and the engine rotation speed reaches its peak, the occurrence of an abnormal condition of the system is diagnosed. However, since the detection of the abnormal condition is based on only one diagnostic result, it may cause a wrong diagnosis when the engine conditions (e.g., driving condition, varying time) for diagnosis varies greatly. Also, in the case of diagnosis based on the peak engine rotation speed, the rising rate of the engine rotation speed is changed by environmental conditions, such as altitude and intake air temperature, as well as by engine conditions, variations in engine parts, and variations in engines themselves. As a result, the precision of the resulting diagnosis may be adversely affected.

SUMMARY OF THE INVENTION

According to one embodiment of the present invention, there is provided an improved diagnostic apparatus for supplying assist air in an internal combustion engine, which apparatus achieves high diagnosis precision while maintaining a relatively simple design. Such apparatus includes: an assist air passage for guiding intake air from upstream of a throttle valve to a fuel injector installed downstream of said throttle valve; an assist air control valve installed in said assist air passage; a sensor for detecting an engine operating parameter; and a control unit. The control unit includes a data storage portion and a data processing portion. The control unit selectively forces the assist air control valve open and closed upon detection of at least one predetermined diagnosis condition. The control unit then calculates and stores a plurality of values corresponding to changes in the engine operating parameter based on signals received from the sensor, and determines an occurrence of an error associated with the assist air supply based on comparisons of said values with a predetermined value.

According to another embodiment of the invention, there is a method for diagnosing an error in a supply of assist air in an internal combustion engine, the internal combustion engine including an assist air passage for guiding intake air from upstream of a throttle valve to a fuel injector installed downstream of the throttle valve, an assist air control valve installed in said assist air passage; a sensor for detecting an engine operating parameter, and a control unit having a data storage portion and a data processing portion. The method includes: selectively forcing the assist air control valve open and closed upon detection of at least one predetermined diagnosis condition; calculating and storing a plurality of values corresponding to changes in the engine operating parameter based on signals received from the sensor; and determining an occurrence of an error with assist air supply based on comparisons of said values with a predetermined value.

According to one aspect of the invention, the assist air control valve is forced open and closed at least twice prior to determining the occurrence of an error.

According to another aspect of the invention, at least several of the values (for example, three values) are compared with the predetermined value prior to determining an occurrence of an error.

According to still another aspect of the invention, diagnosis of the error is prohibited when any one of the values exceed the predetermined value.

According to yet another aspect of the invention, the predetermined diagnosis condition corresponds to one in which the intake air amount is substantially constant, such as during reduction of vehicle speed and stopping of fuel injection. Such predetermined diagnosis condition also may correspond to an idle operation, or the occurrence of the speed through the throttle valve exceeding the velocity of sound. It may also be detected based on engine load.

According to still another aspect of the invention, the engine operating parameter is any one of intake air amount, aspiration pressure, engine rotation speed, fuel injection amount, and open angle control amount of the idle control valve.

Other features of the invention will be apparent from the following detailed description of preferred embodiments of the invention.

DETAILED DESCRIPTION OF THE PREFERRED EMBODIMENTS

A detailed description of the present invention is now described in reference to the drawings.

Figure 1:
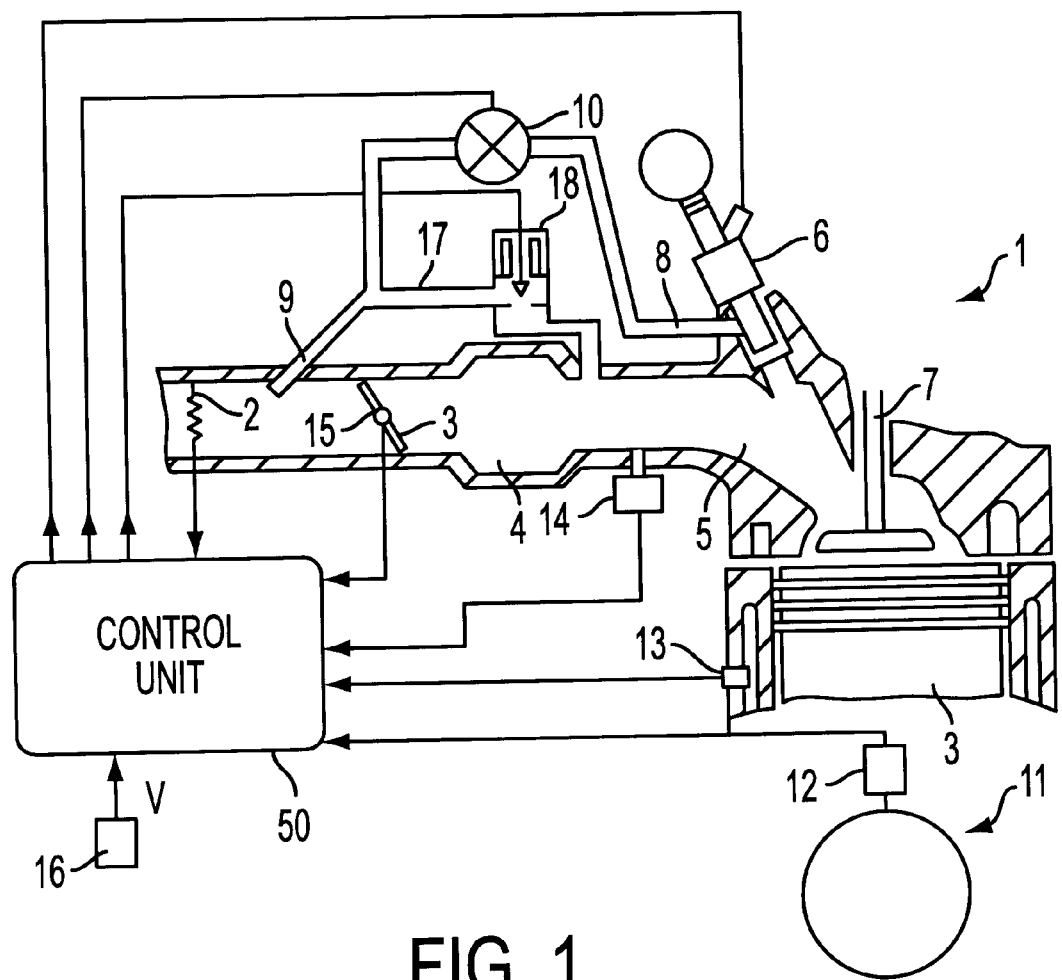
FIG. 1 is a system diagram of a diagnostic apparatus for supplying assist air in an internal combustion engine according to one embodiment of the present invention.

FIG. 1 shows a diagnosis apparatus for supplying air assist in an internal combustion engine. In the internal combustion engine 1, intake air flows through an air cleaner (not shown) and then passes through an air flow meter 2 which detects the intake air amount Q. The intake air is adjusted by a throttle valve 3 and is aspirated into a cylinder through an intake manifold 4 and an intake air port 5. A fuel injection valve 6 is installed in each cylinder.

The fuel injection valve 6 is opened by a drive pulse signal from a control unit 50 which injects the fuel to an intake valve 7. In this example, the control unit 50 comprises a micro computer which includes CPU, ROM, RAM, an analog to digital (A/D) converter, and an input/output interface. The microcomputer is programmed using techniques known in the art to execute the control process described below. As shown, the control unit 50 receives respective detection signals from various sensors, from it which calculates a fuel injection amount (TP) appropriate for the intake air amount. The timing of fuel ignition is based on driving conditions, such as the engine rotation speed.

A distributor 11 has a crank angle sensor 12 which counts a single crank angle signal in synchronization with the engine rotation speed or determines the period of a standard crank angle signal for detecting engine rotation speed $N_E$. A water temperature sensor 13 is installed in a cooling-jacket for detecting the temperature of cooling water $T_W$. Also, an aspiration pressure sensor 14 is installed in the intake manifold 4 for detecting aspiration pressure PB. A throttle sensor 15 is also installed in the intake manifold 4 for detecting an open angle of the throttle valve 3 (TVO). A vehicle speed sensor 16 for detecting vehicle speed V outputs a signal to the control unit 50.

The apparatus according to the embodiment shown includes an air passage 8 which serves as an assist air passage. The assist air passage 8 includes an assist air intake 9, located between the airflow meter 2 and the throttle valve 3. In this particular example, the assist air is received by air intake 9 as a result of a pressure difference between the upstream and downstream sides of the intake (i.e., a natural assist system). The assist air passage 8 has an assist air control valve 10. The downstream side of the assist air passage 8 is connected in proximity to each injection hole of the fuel injection valve 5.

The assist air control valve 10 may comprise an on/off valve or a linear solenoid valve, which injects the assist air in proximity to the fuel injection valve 5 during predetermined conditions. The assist air control valve 10 is controlled by a signal of the control unit 50 so as to selectively supply or cut off the assist air.

A bypass passage 17 is connected to the assist air passage 8 between the assist air intake 9 and the assist air control valve 10. The by-pass passage 17 includes an idle speed control valve 18. The by-pass passages merges with the intake manifold 4 on the downstream side of the throttle valve 3. The idle speed control valve 18 has an electromagnetic coil, which adjusts an open angle on duty control. The open angle of the idle speed control valve 18 is controlled by feedback control of the control unit 50 so as to close at a target rotation speed of a predetermined idle operation.

The control unit 50 not only selectively supplies or cuts off the assist air, but also performs functional diagnosis of the assist air supplying apparatus. As now described in reference to FIGS. 2–5, the control unit 50 performs several operations, including the following: force open/close switching instruction; engine operating parameter changing amount detection; diagnosis; and diagnosis termination.

Figure 2:
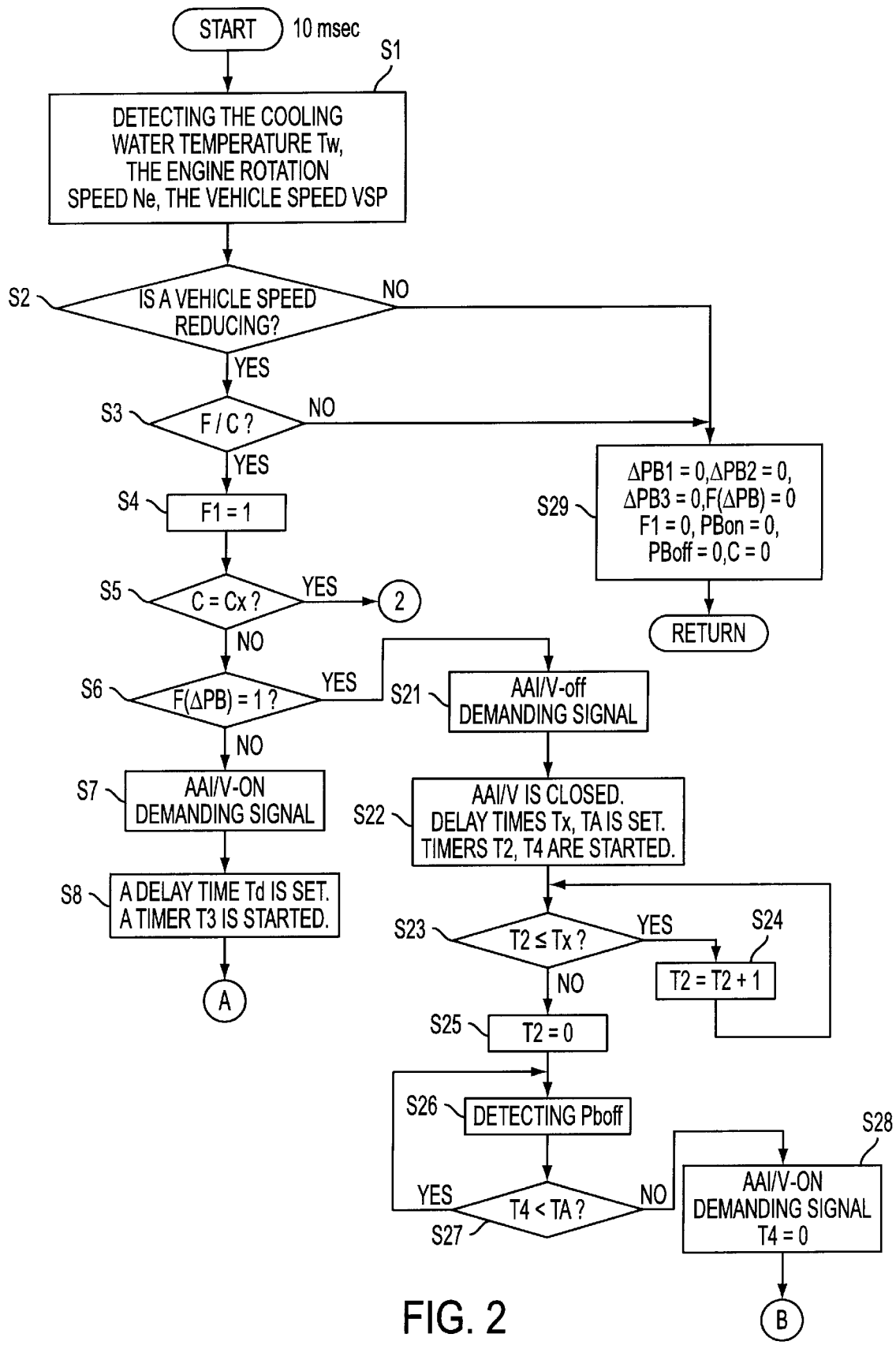
FIGS. 2–4 are flowcharts illustrating the operation of a diagnostic apparatus for supplying assist air in an internal combustion engine according to the embodiment of the present invention.

In reference to FIG. 2, at S1 various input signals are received from sensors such as those described above in reference to FIG. 1. At S2, the control unit determines whether vehicle speed is reducing or not. Detection of speed reduction may be determined based on the difference between the present vehicle speed V and a stored value corresponding to a last detected vehicle speed $V_{OLD}$. Alternatively, speed reduction may be detected based on the detected angle (TVO) of the throttle valve 3. When vehicle speed is reducing, the intake air amount is almost fixed.

If the control unit determines that vehicle speed is not reducing, at S29 the control unit resets several parameters described in detail below. In this example, these parameters include: a first determined pressure difference ΔPB1; a second determined pressure difference ΔPB2; a third determined pressure difference ΔPB3; an aspiration pressure difference determination flag F(ΔPB); a diagnosis termination flag F1; an assist air valve "on" pressure detection flag $PB_{ON}$; and an assist air valve "off" pressure detection flag $PB_{OFF}$; and a sampling count C. Specifically, these parameters are set follows: ΔPB1=0; ΔPB2=0; ΔPB3=0; F(ΔPB)= 0; F1=0; $PB_{ON}$=0; $PB_{OFF}$=0; and a C=0. After being set in this manner, the control unit returns to the start of the routine.

Figure 6:
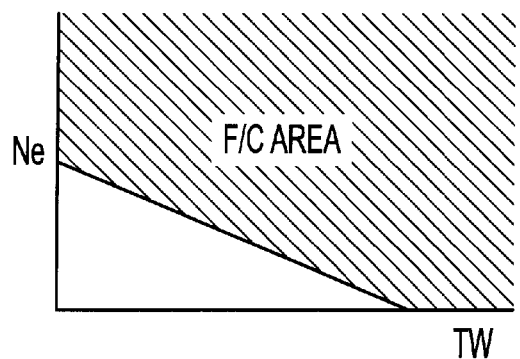
FIG. 6 is a table showing an operating area in which fuel supply is cut according to the embodiment of the present invention.

If vehicle speed is reducing, at S3 the control unit determines whether a fuel cut (F/C) is running (i.e., whether fuel injection is stopped). This determination may be based on detection of the vehicle speed V in comparison to a predetermined value, or, alternatively, based on relation of the engine speed $N_E$ and the cooling water temperature $T_W$ as shown in FIG. 6.

If both a fuel cut and a vehicle speed reduction are detected, the control unit begins a diagnostic operation commencing with step S4. Otherwise, the control unit sets the above described parameters at S29 and returns to the start of the routine.

At S4 the diagnosis termination flag is set to one. Next, at S5 the control unit determines whether the sampling count C has reached a predetermined value $C_X$ corresponding to a number of samples of a particular engine parameter change. In the example described in reference to FIGS. 2–5, the detected engine parameter change is the change in aspiration pressure ΔPB and the number of samples $C_X$ is equal to three. However, a different number of samples may be taken, or, as mentioned below, changes in a different engine parameter may be determined.

Figure 4:
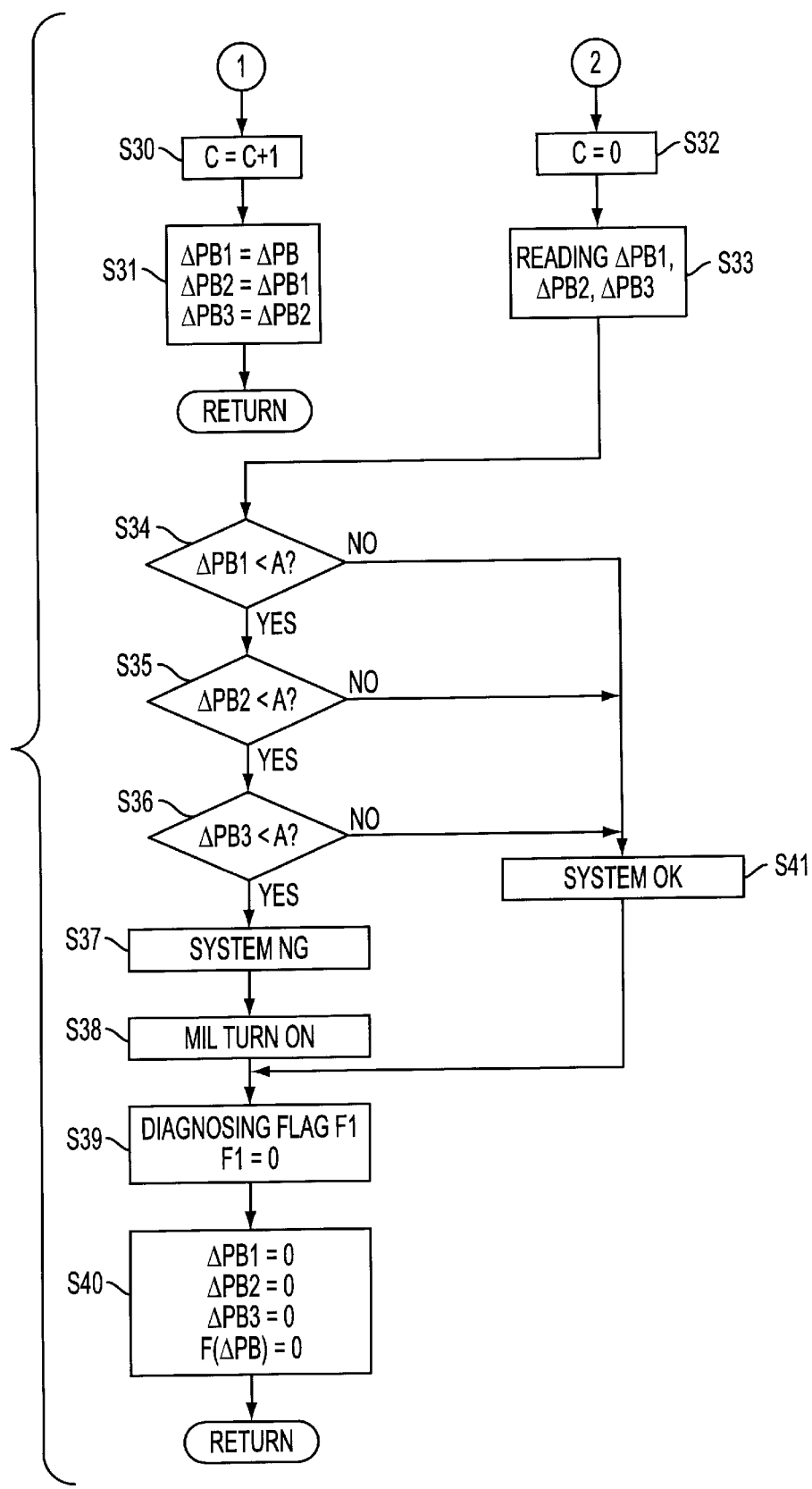

If the sampling amount C equals the predetermined count $C_X$, the control unit completes the operation as described below in reference to steps S32–S40 (FIG. 4). However, if the sampling amount C has not yet reached the predetermined count $C_X$, the control unit then checks the aspiration pressure difference flag F(ΔPB) at S6.

When detection flag F(ΔPB) is equal to one, step S21 is initiated as described below. Otherwise, at S7 the control unit produces a valve open demand signal requesting to open the assist air control valve. Though the valve open demanding signal is produced in the control unit 50, at this time, the valve open demanding signal for the assist air control valve 10 (AAI/V) is prohibited from being output. Instead, a delay time Td is set and a timer T3 is started as shown at S8. At S9 (FIG. 3), the control unit judges whether T3 is under Td. While this occurs (i.e., when T3 has not yet reached Td), the valve open demand signal is prohibited from being output (S18), the assist air shift valve 10 is closed (S19), and an aspiration pressure corresponding to this condition $PB_{OFF}$ is measured (S20). In this example, the aspiration pressure $PB_{OFFS}$ is measured according to the process described herein in reference to FIG. 5.

On the other hand, once T3 equals or exceed Td, at S10 the valve open demanding signal for the assist air control valve 10 is permitted to output, and the assist air control valve 10 then opens. Further, delay times Tx and TB are set, and timers T1 and T5 are initiated to run until the respective delay times Tx and TB expire. Specifically, at S11 the control unit determines whether T1 is less than or equal to Tx. If T1 is less than or equal to Tx, the timer T1 is incremented at S12 and the routine return to step S11 and runs until the timer Tx is exceeded. Once this S occurs, at S13, the timer T1 is reset to 0.

Figure 5:
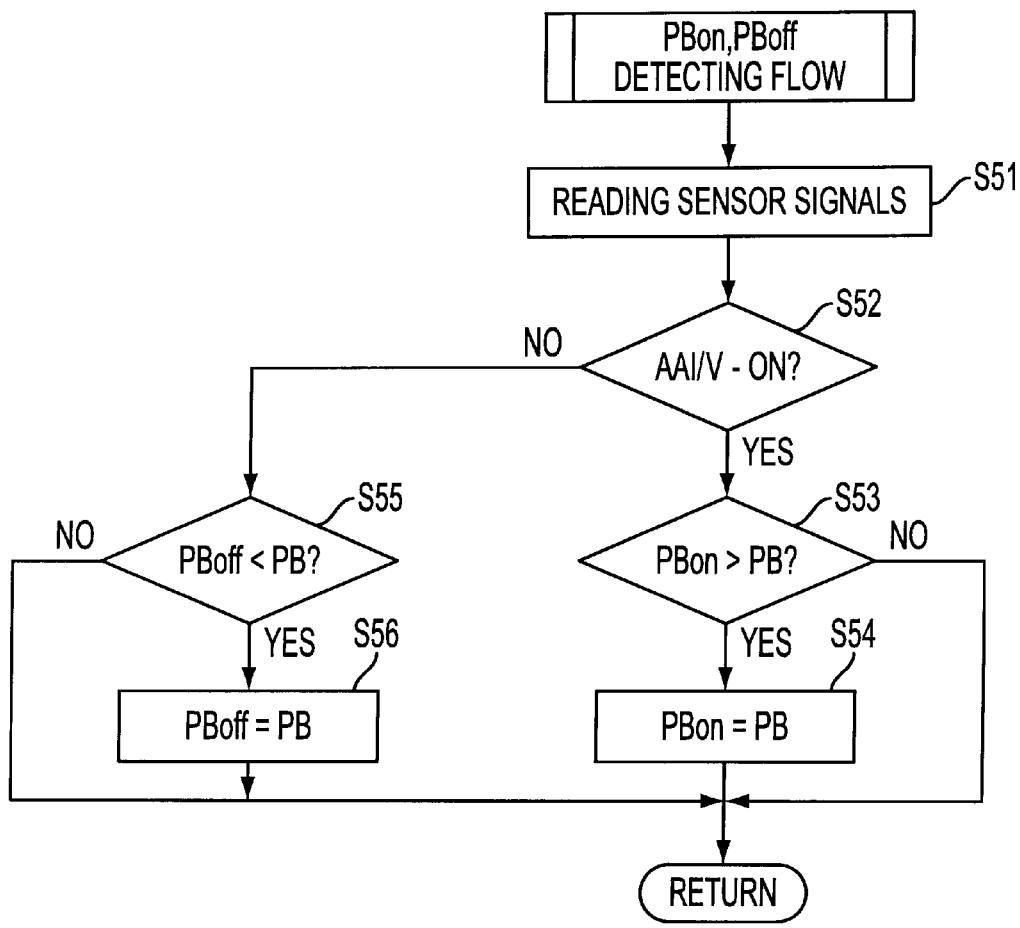
FIG. 5 is a flowchart illustrating a routine for detection of aspiration pressure $PB_{ON}$ and $Pb_{OFF}$ according to the embodiment of the present invention.

At S14, the aspiration pressure corresponding to the open condition of the assist air control valve 10 ($PB_{ON}$) is measured, for example, according to the technique described in reference to FIG. 5. As shown, this takes place prior to timer T5 exceeding time TB.

In this manner, respective values for both $PB_{OFF}$ and $PB_{ON}$ are measured. At S16, the difference between these values ΔPB is calculated. Then at S17, the aspiration pressure difference detection flag F(ΔPB) is set to one, and the timer T5 is reset to zero. The process then continues at S30 (FIG. 4).

At S30, the sampling count C is incremented one unit. Next, at S31 the values of ΔPB1, ΔPB2, and ΔPB3 are updated. That is, the last measured aspiration pressure difference ΔPB is stored as a new value for ΔPB1; a previously stored value ΔPB1 is stored as a new value for ΔPB2; and a previously stored value ΔPB2 is stored as a new value for ΔPB3. The control unit then returns to the start of the routine in FIG. 3.

When the aspiration pressure difference flag F(ΔPB) is 1 at S6 (FIG. 2), at S21 a valve close demand signal for the assist air control valve 10 is produced. Next, at S22 the assist air control valve 10 is closed, delay times Tx and TA are set and timers T2 and T4 are started. As shown at S23 and S24, timer T2 is incremented until it reaches or exceeds Tx. Once this occurs, after resetting T2 to zero at S25, the control unit detects $PB_{OFF}$, for example, as illustrated in FIG. 5.

Figure 3:
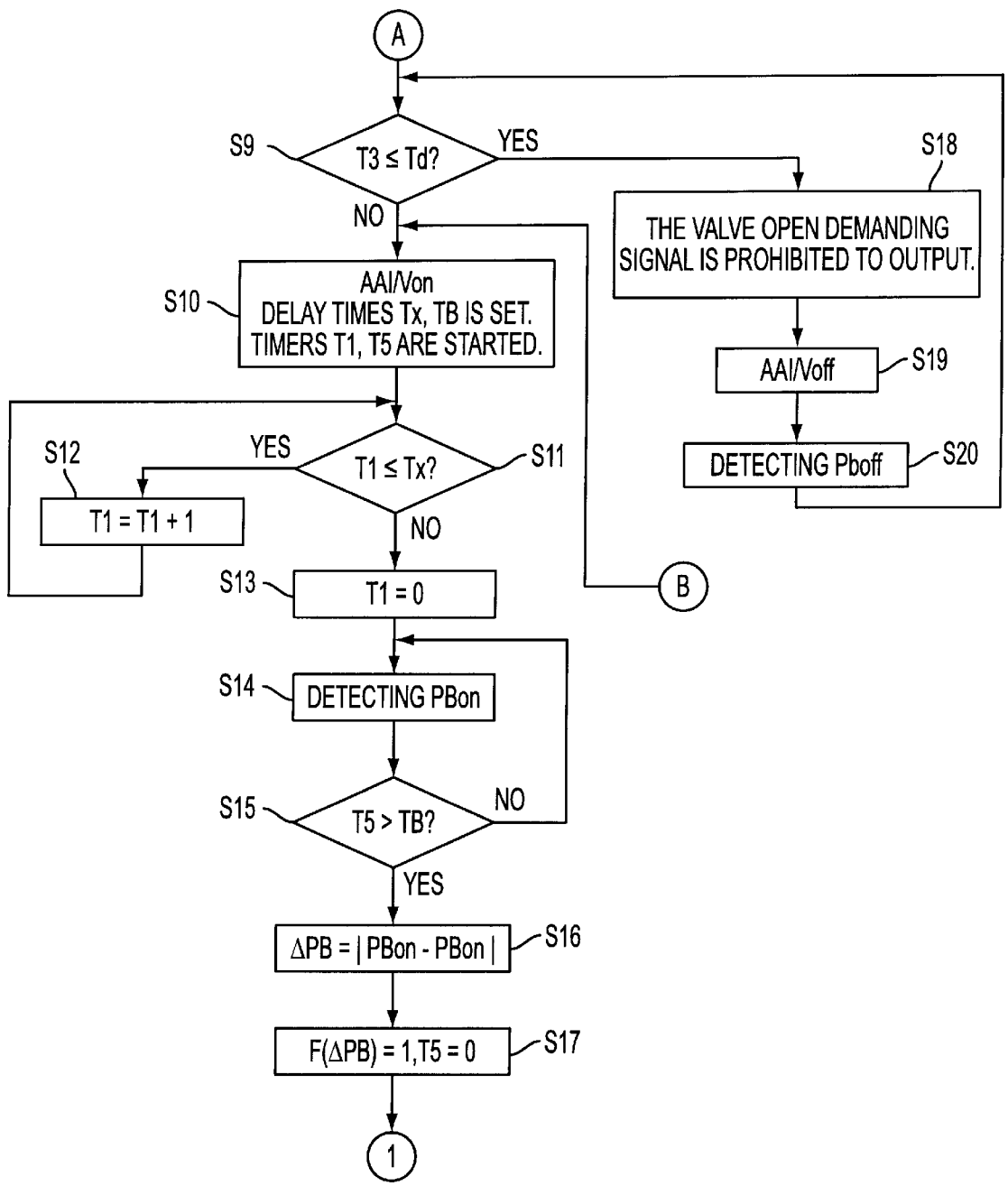

Next, at S27 it is determined whether the timer T4 has reached or exceeded the time TA. Once this occurs, the valve open demand signal for the assist air control valve 10 is produced and the timer T4 is reset to 0 at S28. Then the process continues at S10 (FIG. 3). As described above, a value $PB_{ON}$, corresponding to the aspiration pressure while the assist air valve is open, is measured and a sample aspiration pressure difference ΔPB is determined.

Thus, when certain diagnosis conditions hold, such as decreasing vehicle speed and cutting fuel supply, the difference in aspiration pressure while the assist air valve 10 is open and closed (ΔPB) is sampled a predetermined number of times (e.g., three times. Once this has occurred the process continues at S32.

As shown in FIG. 4, at S32 the sampling count C is reset to 0. The control unit then compares stored samples ΔPB1, ΔPB2, and ΔPB3 (updated and stored at S31) with a predetermined value A. A system failure is determined if each stored value falls below the predetermined value A. Otherwise, the system determines that the assist air control valve 10 opens and closes normally.

Specifically, at S34 the control unit determines whether ΔPB1 is under the predetermined value A. If not, it is determined at S41 that the assist air control valve 10 opens and closes normally. However, if ΔPB1 is below value A, the control unit then determines at S35 whether a previously measured aspiration pressure difference ΔPB2 is below value A. If ΔPB2 is not below A, the control unit determines that the OK result is obtained at S41. Otherwise, the control unit compares the additional aspiration pressure difference value ΔPB3 to A at S36. If this third value also falls below A, the control determines at S37 that the assist air system does not function normally. Then, at S38 a warning lamp (MIL) is illuminated.

Regardless of the result, the diagnosing flag F1 is reset to 0 at S39. Then, the pressure difference values ΔPB1, ΔPB2, ΔPB3, and the pressure difference detect flag F(ΔPB) are reset to zero at S40.

FIG. 5 illustrates a routine for determining aspiration pressure PB corresponding to either an open air assist valve 10 ($PB_{ON}$) or a closed air assist valve ($PB_{OFF}$). Specifically, at S51 the aspiration pressure detected by the aspiration sensor 14 is read. The control unit then determines at S52 whether the assist air control valve 10 is open or closed based on the assist air intake valve signal AAI/V. As illustrated at S53 and S54, if the assist air control valve 10 is open (i.e., AAI/V is on), the control unit stores the current detected pressure PB as $PB_{ON}$ if a previously stored value for $PB_{ON}$ exceeds the current detected pressure PB. Similarly, as illustrated at S55 and S56, if the assist air control valve 10 is closed (i.e., AAI/V is off), the control unit stores the current detected pressure PB as $PB_{OFF}$ if a previously stored value for $PB_{OFF}$ is less than the current detected pressure PB.

In the above mentioned embodiment, it is determined that the assist air supplying apparatus functions normally when aspiration pressure difference ΔPB is sampled a predetermined number of times during certain diagnostic conditions and at least one of the ΔPB samples is above a predetermined value. It is determined that the assist air providing apparatus does not function normally when under such conditions all ΔPB samples fall under the predetermined value. This approach provides accurate diagnosis despite the use of a simple structure.

Furthermore, since diagnosis is performed by opening/closing the assist air control valve 10 forcefully during reducing the vehicle speed, stability in driving performance is maintained and loss of emission performance is avoided. Also, by performing the diagnosis during a reduction in vehicle speed and a stopping of fuel supply as described herein, the disclosed technique avoids reduced driving performance, reduced emission performance, and reduced fuel economy.

While in the above described embodiment, it is determined that the assist air providing apparatus functions normally when ΔPB is sampled three times and all ΔPB values are above a predetermined value A, it can also be determined that the assist air providing apparatus functions normally when a ΔPB that is above the predetermined is value A remains above a predetermined number of times.

Further, while three samples are compared to the predetermined value A before a fault is determined in the example above, it is possible to use two samples in one diagnostic cycle. Since the functional diagnostic control is prohibited at once when any ΔPB is above the predetermined value A, the opening and closing of the assist air control valve 10 is not performed more times than required. This can avoid adverse effects on driving performance, emission performance, and fuel economy.

Figure 8:
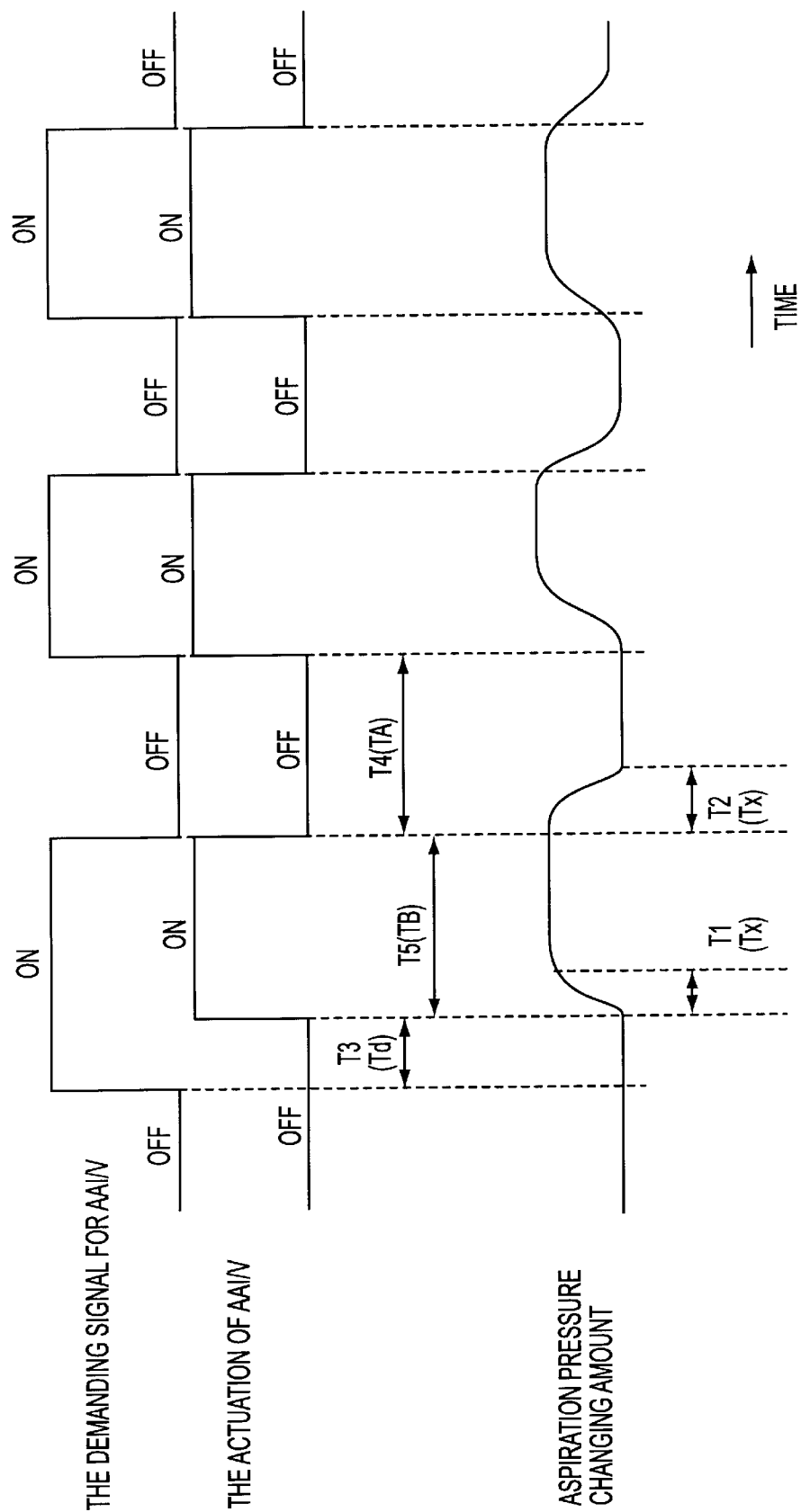
FIG. 8 is a timing chart of a diagnosis method according to the embodiment of the present invention.

FIG. 8 is a timing diagram for the above described embodiment. As shown, the delay times Td and Tx are set when aspiration pressure is stable, and aspiration pressure Pb$_{ON}$ and PB$_{OFF}$ are detected when the assist air control valve 10 is opened and closed. Thus, the error detection of aspiration pressure Pb$_{ON}$ and PB$_{OFF}$ is restricted. As a result, incorrect diagnosis is further avoided and functional diagnosis of the assist air supplying apparatus is performed with high precision.

An additional benefit of the present invention is that improved diagnostic precision may be achieved by basing a diagnostic conditions such parameters as cooling water temperature T$_w$, engine rotation speed N$_e$, vehicle speed V, and atmospheric pressure with predetermined values. As with aspiration pressure, detected differences of such parameters may be compared with a predetermined value.

Furthermore, in the preferred embodiment a diagnostic condition is attained when the engine operating condition is stable and the intake air speed through the throttle valve is above the velocity of sound. Under such conditions the pressure difference across the throttle valve is large, and the aspiration pressure $\Delta$PB can be large during opening and closing of the assist air control valve 10. As a result, diagnostic precision is improved.

Figure 7A:
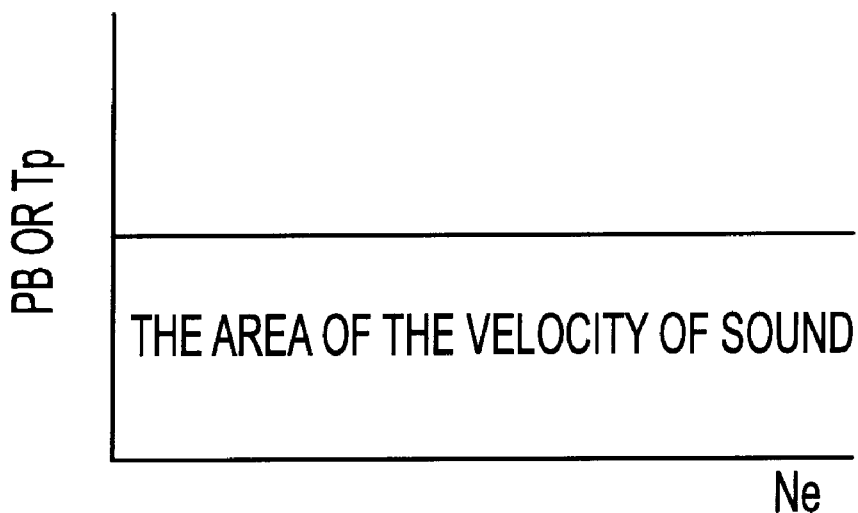
FIG. 7 is a table showing an operating area in which the intake air speed is above the velocity of sound according to the embodiment of the present invention.
Figure 7B:
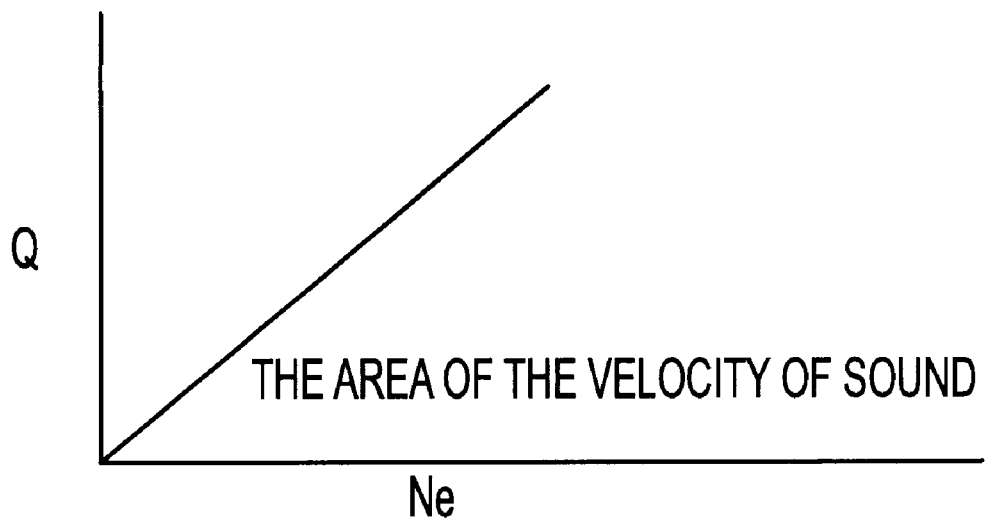

FIG. 7 illustrates preferred engine operating conditions for operation of the present invention. Specifically, the engine operating condition shown is when the intake air speed through the throttle valve goes above the velocity of sound. This condition can be detected by one of aspiration pressure PB, the intake air amount Q, and the standard fuel injection amount TP as shown FIG. 7.

It will be readily appreciated by those skilled in the art that the invention may be practiced by using other engine parameters other than a difference in pressure $\Delta$PB as described in FIGS. 2–5. For example, various other parameters such as a change is of the intake air amount Q ($\Delta$Q), the change of the engine rotation speed N ($\Delta$N), the change of the fuel injection amount TP ($\Delta$TP), and the change of the open angle control amount of the idle control valve 18 during the feedback control of the idle rotation speed can be used.

The entire contents of Japanese Patent Application No. TOKUGAN HEI 10-084383, filed Mar. 30, 1998 is incorporated herein by reference.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. These embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A diagnostic apparatus for supplying an assist air in an internal combustion engine, comprising:

an assist air passage for guiding intake air from upstream of a throttle valve to a fuel injector installed downstream of said throttle valve;

an assist air control valve installed in said assist air passage;

a sensor for detecting an engine operating parameter; and a control unit, including a data storage portion and a data processing portion, wherein the control unit: selectively forces the assist air control valve open and closed upon detection of at least one predetermined diagnosis condition; calculates and stores a plurality of values corresponding to changes in the engine operating parameter based on signals received from the sensor; and determines an occurrence of an error with assist air supply based on comparisons of said values with a predetermined value;

wherein the control unit determines an occurrence of an error only upon comparison of at least several of said values with said predetermined value.

2. A diagnostic apparatus for supplying an assist air in an internal combustion engine as defined in claim 1, wherein the control unit determines an occurrence of an error only upon comparison of at least three of said values with said predetermined value.

3. A diagnostic apparatus for supplying an assist air in an internal combustion engine as defined in claim 1, wherein said control unit prohibits diagnosis of said error when any one of said values exceed said predetermined value.

4. A diagnostic apparatus for supplying an assist air in an internal combustion engine as defined in claim 1, wherein said at least one predetermined diagnosis condition corresponds to one in which the intake air amount is substantially constant.

5. A diagnostic apparatus for supplying an assist air in an internal combustion engine as defined in claim 1, wherein said predetermined diagnosis condition is during reduction of vehicle speed.

6. A diagnostic apparatus for supplying an assist air in an internal combustion engine as defined in claim 1, wherein said predetermined diagnosis condition is during stopping of fuel injection.

7. A diagnostic apparatus for supplying an assist air in an internal combustion engine as defined in claim 1, wherein said predetermined diagnosis condition is during an idle operation.

8. A diagnostic apparatus for supplying an assist air in an internal combustion engine as defined in claim 1, wherein said predetermined diagnosis condition occurs when intake air speed through said throttle valve above the velocity of sound.

9. A diagnostic apparatus for supplying an assist air in an internal combustion engine as defined in claim 1, wherein said predetermined diagnosis condition is detected based on engine load.

10. A diagnostic apparatus for supplying an assist air in an internal combustion engine as defined in claim 1, wherein said engine operating parameter is any one of intake air amount, aspiration pressure, engine rotation speed, fuel injection amount, and open angle control amount of said idle control valve.

11. A diagnostic apparatus for supplying an assist air in an internal combustion engine as defined in claim 1, wherein said engine operating parameter is aspiration pressure.

12. A diagnostic apparatus for supplying an assist air in an internal combustion engine as defined in claim 11, wherein said predetermined diagnosis condition is during reduction of vehicle speed and stopping of fuel injection.

13. A diagnostic apparatus for supplying an assist air in an internal combustion engine comprising:

an assist air passage for guiding intake air from upstream of a throttle valve to a fuel injector installed downstream of said throttle valve;

an assist air control valve installed in said assist air passage;

a sensor for detecting an engine operating parameter; and a control unit, including a data storage portion and a data processing portion, wherein the control unit: selectively forces the assist air control valve open and closed upon detection of at least one predetermined diagnosis condition; calculates and stores a plurality of values corresponding to changes in the engine operating parameter based on signals received from the sensor; and determines an occurrence of an error with assist air supply based on comparisons of said values with a predetermined value;

wherein said control unit selectively forces the assist air control valve open and closed at least twice prior to determining the occurrence of an error.

14. A method for diagnosing an error in a supply of assist air in an internal combustion engine, said internal combustion engine including an assist air passage for guiding intake air from upstream of a throttle valve to a fuel injector installed downstream of said throttle valve, an assist air control valve installed in said assist air passage; a sensor for detecting an engine operating parameter, and a control unit having a data storage portion and a data processing portion, the method comprising:

selectively forcing the assist air control valve open and closed upon detection of at least one predetermined diagnosis condition;

calculating and storing a plurality of values corresponding to changes in the engine operating parameter based on signals received from the sensor; and determining an occurrence of error with assist air supply based on comparisons of said values with a predetermined value;

wherein at least several of said values are compared with said predetermined value prior to determining an occurrence of an error.

15. The method according to claim 14, wherein at least three of said values are compared with said predetermined value prior to determining an occurrence of an error.

16. The method according to claim 14, wherein diagnosis of said error is prohibited when any one of said values exceed said predetermined value.

17. The method according to claim 14, wherein said at least one predetermined diagnosis condition corresponds to one in which the intake air amount is substantially constant.

18. The method according to claim 14, wherein said predetermined diagnosis condition is during reduction of vehicle speed.

19. The method according to claim 14, wherein said predetermined diagnosis condition is during stopping of fuel injection.

20. The method according to claim 14, wherein said predetermined diagnosis condition is during an idle operation.

21. The method according to claim 14, wherein said predetermined diagnosis condition occurs when intake air speed through said throttle valve above the velocity of sound.

22. The method according to claim 14, wherein said predetermined diagnosis condition is detected based on engine load.

23. The method according to claim 14, wherein said engine operating parameter is any one of intake air amount, aspiration pressure, engine rotation speed, fuel injection amount, and open angle control amount of said idle control valve.

24. The method according to claim 14, wherein said engine operating parameter is aspiration pressure.

25. The method according to claim 24, wherein said predetermined diagnosis condition is during reduction of vehicle speed and stopping of fuel injection.

26. A method for diagnosing an error in a supply of assist air in an internal combustion engine, said internal combustion engine including an assist air passage for guiding intake air from upstream of a throttle valve to a fuel injector installed downstream of said throttle valve, an assist air control valve installed in said assist air passage; a sensor for detecting an engine operating parameter, and a control unit having a data storage portion and a data processing portion, the method comprising:

selectively forcing the assist air control valve open and closed upon detection of at least one predetermined diagnosis condition;

calculating and storing a plurality of values corresponding to changes in the engine operating parameter based on signals received from the sensor; and determining an occurrence of an error with assist air supply based on comparisons of said values with a predetermined value;

wherein the assist air control valve is forced open and closed at least twice prior to determining the occurrence of an error.

* * * * *